United States Patent [19]

Milligan

[11] Patent Number: 5,528,765
[45] Date of Patent: Jun. 18, 1996

[54] SCSI BUS EXTENSION SYSTEM FOR CONTROLLING INDIVIDUAL ARBITRATION ON INTERLINKED SCSI BUS SEGMENTS

[75] Inventor: James H. Milligan, Shoreview, Minn.

[73] Assignee: R. C. Baker & Associates Ltd., Burnsville, Minn.

[21] Appl. No.: 31,604

[22] Filed: Jun. 15, 1993

[51] Int. Cl.⁶ ........................................ G06F 13/36
[52] U.S. Cl. .................. 395/287; 395/200.06; 370/85.2; 370/85.4; 364/240; 364/240.2; 364/242.6; 364/242.92; 364/DIG. 1
[58] Field of Search .................................... 395/325, 275, 395/200, 200.06, 285, 287, 306, 308; 370/85.2, 85.4, 85.6; 340/825.5, 825.51

[56] References Cited

U.S. PATENT DOCUMENTS

| | | | |
|---|---|---|---|
| 4,257,095 | 3/1981 | Nadir | 395/325 |
| 4,320,467 | 3/1982 | Glass | 395/301 |
| 4,620,278 | 10/1986 | Ellsworth et al. | 395/325 |
| 4,706,190 | 11/1987 | Bomba et al. | 395/325 |
| 4,961,140 | 10/1990 | Pechanek et al. | 395/285 |
| 5,129,090 | 7/1992 | Bland et al. | 395/725 |
| 5,206,946 | 4/1993 | Brunk | 395/500 |
| 5,237,695 | 8/1993 | Skokan | 395/725 |
| 5,239,651 | 8/1993 | Sodos | 395/725 |
| 5,265,211 | 11/1993 | Amini et al. | 395/325 |
| 5,293,493 | 3/1994 | Smith et al. | 395/325 |
| 5,317,696 | 5/1994 | Hilgendorf | 395/325 |
| 5,345,562 | 9/1994 | Chen | 395/275 |
| 5,412,783 | 5/1995 | Skokan | 395/285 |
| 5,418,914 | 5/1995 | Heil et al. | 395/293 |
| 5,440,698 | 8/1995 | Sindhu et al. | 395/200.08 |
| 5,454,111 | 9/1995 | Frame et al. | 395/288 |

*Primary Examiner*—Gopal C. Ray
*Attorney, Agent, or Firm*—Robert C. Baker; Jeffrey A. Proehl

[57] ABSTRACT

This digital communication method and system permits extended distance communication on a SCSI bus despite the time constraints imposed on certain bus operations such as arbitration. The bus system is comprised of discrete bus segments each having a portal node and one or more devices interfaced thereon. All nodes are connected together by a serial link. Each node seizes control of its bus segment and imposes a pseudo-busy condition to prevent bus operations such as arbitration. A token message passed over the serial link between nodes allows one node at a time to release control of its segment to permit arbitration among the devices interfaced on its segment. A source device on the released segment that gains control of the segment as a result of arbitration may communicate with a destination device anywhere on the bus system.

37 Claims, 8 Drawing Sheets

SCSI BUS EXTENSION SYSTEM FOR CONTROLLING INDIVIDUAL ARBITRATION ON INTERLINKED SCSI BUS SEGMENTS

BACKGROUND OF THE INVENTION

This invention relates to improvements for extending communication on a digital electronic bus, and more particularly to methods and systems for enhancing extended distance communication on a SCSI bus. SCSI refers to Small Computer Systems Interface.

The SCSI bus is one where the SCSI adapter devices for computers as well as the SCSI controller devices for peripherals are simple and economical, highly standardized, and frequently built into the computers and peripherals designed for the bus. Arbitration among the SCSI devices on the bus is required for communication control of it. Each device on the bus has a priority, and the device of highest priority contending for communication control of the bus must win the arbitration. Arbitration is conducted within a predetermined time window common to all devices, but each SCSI device on the bus acts independently in detecting the start (and end) of the time window. Signal propagation delay on the bus can vary the time different devices detect that the bus is free for the taking. If the length of the bus is too great, signal propagation delay can cause a low priority device to think it has won an arbitration because it never received or recognized a signal from a higher priority device within what it thought was the time window, or the propagation delay can cause two or more devices to believe they all have won. In either event, the operation of the bus is impaired. Each device on the bus makes its own determination as to whether or not it has prevailed in an arbitration, and will yield only to a device of higher priority. Yielding occurs when the device of higher priority asserts, at the closing step of arbitration, a select or reselect or equivalent. Then follows the address communication step between two devices on the bus, and the address assigned to each device may be the same as its priority identifier. The winner of the arbitration is the source device (e.g., initiator), and it addresses a destination device (e.g., target). The response from the destination device back to the source must be received within a predetermined time interval in order for the source to know that it has made successful contact with its destination device (but this time interval for response is quite long, and has not, relatively speaking, been the major obstacle to SCSI bus extension). Thereafter, once the SCSI protocol passes the addressing time constraints, communication between the SCSI devices (e.g., data transfer) is relatively not time constrained and may be accomplished asynchronously (e.g., comparable to an interlock communication) or synchronously (comparable to streaming communication).

Simply put, the timing for SCSI arbitration and the less severe timing for addressing are administered by each device independently of the others, are generally preset in the devices at the time of manufacture, and are not normally adjusted or suspended by elements external to the devices at any later time. This is in contrast to FASTBUS (ANSI/IEEE Std 960-1989) where arbitration time intervals are administered by a separate arbitration timing controller on each segment, and the time intervals can be adjusted according to need. Address timing in FASTBUS can be suspended by a segment interconnecting device that issues a "wait" signal on its segment when it detects from its table that extended communication is needed to a different segment in order to complete the communication. Different segments of FASTBUS may be in full operation simultaneously, and multiple arbitrations may be necessary as communication is extended to different segments. The sophisticated features of FASTBUS are far beyond the simplicity of the SCSI bus.

The simplicity of the architecture of the SCSI bus gives it great advantages—and one great disadvantage, namely severe limitation of its bus length. Extending that length to any significant distance has been a hitherto unsolved problem. The problem is caused by device independence in administering the time constraints for conducting arbitration and, to a much lesser extent, the time constraints for the addressing phase, i.e., the initial response to the initial communication between devices (that is, selection and reselection). It is the arbitration time constraints that historically have led to reliable SCSI bus lengths not exceeding about 25 meters. But as small computers have become more and more sophisticated and capable of handling tremendous amounts of data—even sometimes replacing mainframes and minicomputers—a pressing need has arisen to increase the capability of the SCSI bus by extending its distance (to data devices and other peripherals) to an extent significantly beyond that for which it was originally designed.

This has led to bus configurations employing serial links (fiberoptic and otherwise) to stretch the bus as much as 300 meters (e.g., 1,000 feet). Some have claimed that the SCSI bus can be extended by fiberoptic cable to almost 1,000 meters (e.g., 3,000 feet). However, no one, insofar as is known, has ever claimed that SCSI bus extension has left arbitration free of adverse consequences, especially when the extension exceeds about 300 meters.

This invention is directed to a solution to the aforenoted vexing problem. For the first time insofar as is known, the extension of a SCSI bus can be accomplished without causing adverse consequences to arbitration (and also without adverse consequences to addressing as in selection and reselection), despite extension of the bus well beyond 300 meters and even well beyond 1,000 meters into distances measured by kilometers and miles. The invention easily permits extensions exceeding the distances traversed within the time constraints for SCSI arbitration, and even exceeding the distances traversable by a SCSI address response within the SCSI time constraints for the response. Thus extension distances exceeding 10 or 20 kilometers (e.g., over 10 miles) are made possible by the invention. Further, even longer extensions, over thousands of kilometers or miles, as for example over telephone lines, are made possible by using principles of the invention.

The teachings of this invention—also for the first time, insofar as is known—make principles of channel extension useful for the transfer of data and control signals on a SCSI bus. Such principles are set forth in Milligan, U.S. Pat. No. 4,642,529 (Re 33,404), Calta et al., U.S. Pat. No. 4,866,609, and Waldron et al., U.S. Pat. No. 5,077,656, all here incorporated by reference. Such principles have heretofore been useless on SCSI simply because they cannot accommodate the SCSI device timing constraints for arbitration. When used in combination with teachings of this invention, however, such principles become useful for the first time for handling data transfer and other information phase transfers on a SCSI bus, as well as for addressing and response improvements for the SCSI bus.

More Background on SCSI

The fundamental features of the Small Computer System Interface (SCSI) have been described above and constitute the basic meaning of "SCSI" as used in this specification. They distinguish the SCSI bus from all others. Nevertheless, additional background may contribute to better appreciation of the invention illustrated in the preferred embodiment section below.

The origin of the fundamental features for the SCSI bus precedes the SCSI standard adopted by the American National Standards Institute as ANSI X3.131-1986. Before that, the interface known as the Shugart Associates System Interface had enjoyed significant market success (as stated by the Institute in the Foreword to its standard) and was the basis for the SCSI standard. Enhancements for the standard have been proposed in a revision known as SCSI-2 (ANSI X3.131-199X). Other enhancements or modifications for the SCSI bus are illustrated in U.S. patents such as: Korpi, U.S. Pat. No. 4,864,291; Davis, U.S. Pat. No. 5,081,578; and Lattin, Jr., U.S. Pat. No. 5,099,137. It is therefore emphasized that the following specific details from the present SCSI standard are to be looked upon as but a concrete illustration of the SCSI fundamentals aforediscussed.

The classic SCSI bus employs 18 parallel lines, or wires, each associated with a distinct signal "bit" of parallel digital information. Nine of the lines, or bits, are dedicated to data signals and nine to control signals. The nine data signal bits include eight data bits (DB(0) to DB(7)) and a data parity bit (DB(P)). The nine control signal bits include an attention bit (ATN), a bus busy bit (BSY), an acknowledgement bit (ACK), a reset bit (RST), a message bit (MSG), a select bit (SEL), a control/data bit (C/D), a request bit (REQ), and an input/output bit (I/O).

To identify individual SCSI devices for addressing purposes, the SCSI protocol provides that an identification (ID) bit be assigned to each device on the bus. The SCSI ID bit of a device is not a single dedicated line on the parallel bus but is rather one particular bit of the eight parallel data signal bits on the SCSI bus that has been exclusively assigned to a particular SCSI device. Thus the maximum number of IDs for devices on a SCSI bus is limited to eight when eight data bits are employed in the bus. (Although SCSI-2 has 32 data bits, the IDs are at present limited to the first eight data bits to insure compatibility between SCSI-1 and SCSI-2. This may change to allow more than eight data bits for ID purposes.) To "assert" its ID bit, a device must drive its assigned data bit on the bus to a "true" state. The ID bit assigned to a device also determines the priority of that device with respect to other devices on the bus when more than one device competes for bus control. DB(0) or data bit 0 is lowest priority, and DB(7) is highest.

A device seeking control of the bus can initiate the ARBITRATION phase only after detecting the BUS FREE phase on the bus.

The BUS FREE phase (i.e., all previous communication between devices on the bus has ended) is detected by a device when the BSY bit and the SEL bit on the bus are not asserted (i.e., are not true) for a "bus settle delay" interval (e.g., 400 nanoseconds (ns)). The device must then wait a "bus free delay" time interval (800 ns) before signaling its intention to seek control of the SCSI bus by asserting its BSY bit and its data bit that corresponds to its SCSI ID for a maximum period of the "bus set delay" (1.8 microseconds (us) measured from the end of the bus settle delay, i.e., the point of detection of BUS FREE).

The assertion of ID bits by one or more devices in response to the BUS FREE phase initiates the ARBITRATION phase on the SCSI bus. After the arbitration delay time interval has passed (2.2 us from when the device first asserted the BSY and ID bits (2.4 us in SCSI-2)), each participating device must then examine all of the ID bits asserted on the bus and then each device individually determines if it has "won" the arbitration. If an arbitrating device detects that an ID bit with a higher priority than its own ID bit has been asserted on the SCSI bus, it knows that a device with a higher priority ID bit is also participating in the arbitration and that it has "lost" its bid to control the bus. If a device senses that its ID bit is the highest asserted during the arbitration, it knows that it is the "winner" of the arbitration.

The winning device then asserts the SEL bit on the SCSI bus. Within a bus clear delay interval (800 ns), the other arbitrating devices (i.e., the "losers" of the arbitration), if any, must relent by dropping their asserted signal bits. The winning device then waits at least a bus clear delay plus a bus settle delay interval (1200 ns total) after it first asserted the SEL bit before beginning the SELECTION (or RESELECTION) phase.

During the SELECTION phase, the arbitration-winning ("initiator") device addresses the device with which it intends to communicate (the "target"). This is done while continuing to assert the BSY and SEL bits raised during the ARBITRATION phase. Specifically, the initiator device (arbitration winner) asserts its ID bit and the ID bit of its intended target on the bus. The initiator device then waits two de-skew delay intervals (90 ns total) before dropping the BSY bit. It then waits a bus settle delay interval (400 ns) before testing the SCSI bus for a response from the target.

During the SELECTION phase all other devices on the SCSI bus monitor for their respective ID bits on the bus to determine which device is the intended target of the proposed communication. When a device discovers that its ID bit and the SEL bit are asserted and the BSY and I/O bits are not asserted for a period of a bus settle delay interval, the device detects that it has been selected as the target of the communication. The target device then asserts the BSY bit within a "selection abort time" interval (200 us) of its detection of being selected as the target. Once the initiator detects that the target has responded (i.e., the BSY bit is true), it drops the SEL bit within two de-skew delay intervals (90 ns) and then enters into one of the "information transfer phases". The information transfer phases are Command, Data, Status, and Message (see ANSI X3.131-1986, §5); they are grouped together as "information transfer phases" because they are all used to transfer data or control information on the data bus lines (with usage of control signal bus lines also).

When the "winning" device asserts the I/O bit after the ARBITRATION phase (along with BSY, SEL, and the device IDs), the RESELECTION phase (rather than the SELECTION phase) is entered. The RESELECTION phase is instituted by the target of a prior communication that was discontinued for some reason and now the target wishes to reestablish the communication path and continue the communication. The RESELECTION operation requires that the winner operate as a target during the information transfer phases and the device being reselected operate as the initiator (i.e., the same roles performed by each during the prior discontinued communication).

SUMMARY OF THE INVENTION

This invention extends the SCSI bus as a physical structure or system by dividing it into segments, each controlled by a portal node. All nodes are interlinked to permit communication between any of the SCSI devices on different segments of the total bus. A serial link is the ideal connection.

The portal nodes are not SCSI devices as such but have the capability of imitating SCSI devices in the sense of exerting operational control over the bus segment on which they are interfaced so as to prevent all devices on that segment from arbitrating for control of it as well as from communicating with each other. In the most preferred practice of the invention, the portal node of each segment carries a priority or dominance at least one step higher than the highest priority SCSI device on the particular segment on which the node is interfaced. Having such a dominant priority, a portal node can always win an arbitration (i.e., pseudo-arbitration) in which it participates, and thus seize operational control of its bus segment and thereby prevent all devices on that segment from initiating any communication. The portal node does not operate as a bar to any communication onto its bus segment whenever the communication arises from a source device (i.e., arbitration winner whether initiator or target) located on an entirely different bus segment of the extended SCSI bus system.

A further preferred feature of each portal node is its ability to release its operational control over its bus segment so as to permit arbitration among devices on its segment, and then, after a predetermined time period has passed, either to (a) reseize its segment if no device on it successfully won an arbitration or (b) refrain from reseizing to allow that segment to remain under the control of a SCSI device on it if that SCSI device won the arbitration of that time period and became a source device for communication on the bus.

For most reliable results, arbitration among devices on the bus is allowed to take place on only one bus segment at a time. In this way, an arbitration on one segment (after all bus segments have been seized by their respective nodes so as to be under node operational control) permits a winning source device to reach a destination device anywhere on the bus (even a destination device on a segment different from the source device) without need for any further arbitration. Very long distances for a serial link can be significant with respect to the addressing phase, but that is overcome in the practice of the invention by node performance which sends back to the source device a false response within the time constraints of SCSI so that the source device believes that it has received an authentic response from its destination device. In the meantime, the node of the segment on which the source device is located passes the initial or addressing communication out on the link between its segment and other nodes of the system. The connecting address message out from the originating node includes not only the address for the destination device, but also the address of the originating or source device as well as the marker or identification code for the portal node on which the source device is located. Other nodes on the serial link receiving this address message examine their record or table of device addresses on their bus segment and the node having the device addressed passes the communication or address message through it to its segment where it is received by the destination device. At that point, the destination device suitably responds, and the response is picked up by the node carrying the destination device and coded in a connecting message sent back onto the serial link to the node carrying the source device. The node having the source device receives the message from the serial link and replaces its false response to the source device with the authentic response from the destination device, following which further signals of data bus information transfer can be exchanged between the source and destination devices in a variety of ways (e.g., using known principles of channel extension) since time constraints such as in arbitration and the address communication (i.e., initial addressing and response) are no longer applicable.

Many other benefits and advantages and features of the invention will further be evident as this description proceeds.

DESCRIPTION OF THE PREFERRED EMBODIMENT

This detail is offered so as to illustrate and thereby give clear understanding of the invention, and is not to be interpreted as limiting the invention to the specific details discussed.

1. Chart of Symbols

These symbols are used in describing the invention and are not standard SCSI symbols.

| | |
|---|---|
| P-BSY | Pseudo-BSY, a node signal imitating SCSI BSY bit |
| P-DB (7) | Pseudo-DB (7), a node signal imitating SCSI DB (7) bit |
| P-SEL | Pseudo-SEL, a node signal imitating SCSI SEL bit |
| CBF | Clear Bus Free (high when node does not control bus segment, low when node does) |
| BWON | Bus Won, a signal sent to microprocessor indicating (when it is high or true) that node controls bus segment |
| GMO | Gate Microprocessor Output, a signal gating microprocessor output from node onto SCSI bus segment |
| LRES | Logic Reset; the logic is reset after either BWON or bus lost so logic can reseize bus at next BUS FREE. The signal resets the contention signaling logic. |
| DBF | Detect Bus Free, a node internal signal |
| DBF + 800 | Counter terminal becomes true 800 ns after DBF becomes true |
| DBF + 3200 | Counter terminal becomes true 3200 ns after DBF becomes true |
| DBF + 6400 | Counter terminal becomes true 6400 ns after DBF becomes true |
| INIT | Initialize (from microprocessor), a signal asserted in node during initialization of system |
| PARB | Permit Arbitration (from microprocessor) when high, devices are allowed to arbitrate; when low, bus segment is seized at DBF + 800 |
| REL | Release Bus, a signal from the microprocessor |

(when high, control of bus segment is
maintained; when low, bus segment is released)

As used herein, a "source" device is one asserting address communication, whether in a selection or reselection; and a "destination" device is an intended recipient of a communication from a source device in either a SCSI selection or reselection. (Thus a source device is an SCSI initiator on selection and a SCSI target on reselection; and a destination device is a SCSI target on selection and a SCSI initiator on reselection.)

Herein SCSI adapters and controllers as well as the computers and peripherals associated with them are collectively referred to as SCSI devices. Such devices include microcomputers (as well as larger computers), data terminals, servers, magnetic disk drives, printers, plotters, optical disk drives, CD-ROM drives, magnetic tape drives, and others. A SCSI device as used herein may also comprise a SCSI controller that controls access to more then one peripheral.

Figure 1:
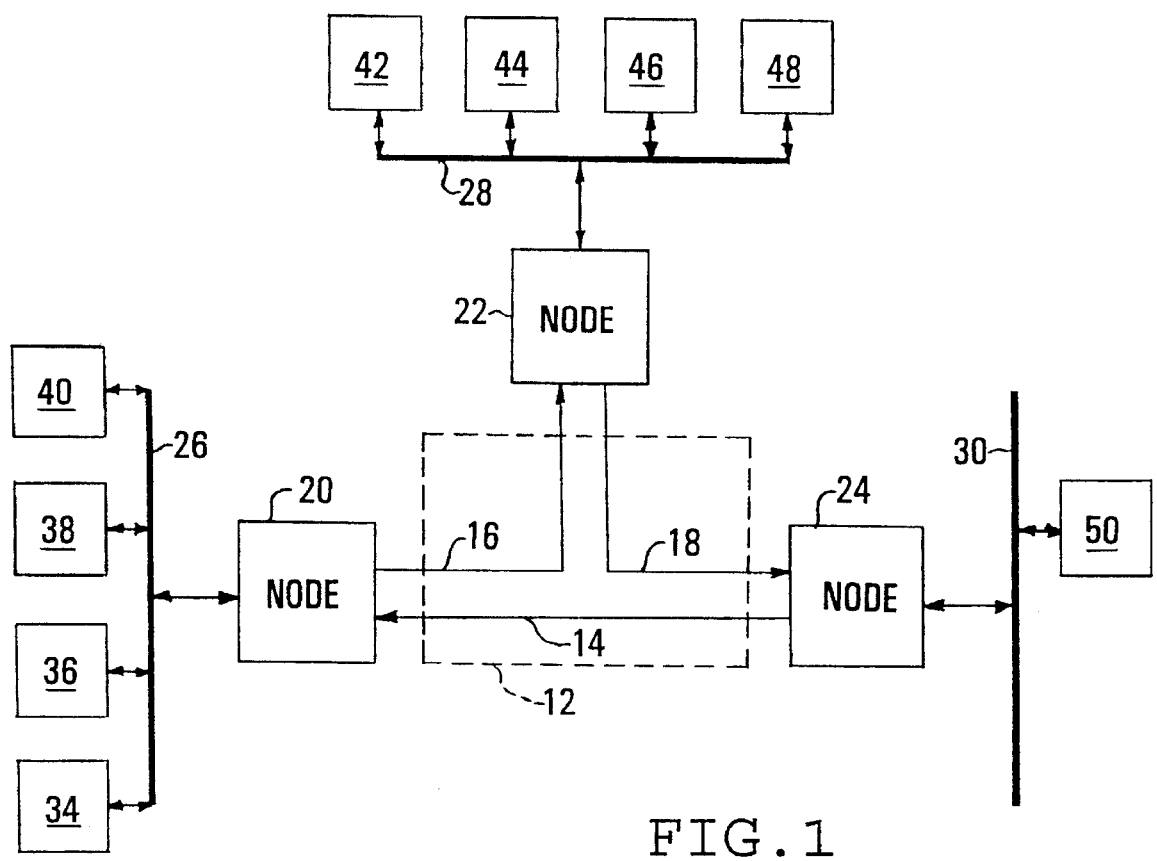
FIG. 1 is a schematic diagram of a SCSI bus of the invention, showing the general relationship between the central serial link, the portal nodes, and the bus segments having SCSI devices on them.

2. The Bus System of FIG. 1

A serial link 12 (consisting of portions 14, 16, and 18) connects portal nodes 20, 22, and 24 and provides the path for serial transmissions between the individual nodes. Each node is also interfaced on a discrete digital communication bus segment. Each bus segment 26, 28, 30 has interfaced on it at least one SCSI digital device, and generally two or more. Several devices are illustrated and marked by even numbers 34–50, inclusive. A complete SCSI bus system should have at least one device capable of being a source device of the SCSI initiator type. The serial link 12 and the bus segments form an extended communication SCSI bus that permits a SCSI device to communicate with any other SCSI device on the extended SCSI bus system. The length of each segment is controlled to insure reliable arbitration on it. Usually the length should not exceed about 25 meters, although lengths of 50 or more meters may sometimes be useful and possibly reliable enough for some systems.

The serial link 12 is preferably comprised of serial transmission media suitable for high speed digital communications such as optical fiber media (although electrical signal conducting wires or other media may be used). A ring-like configuration is suitable, but any other configuration may be used so long as it permits the serial link communication among all of the nodes.

Serial messages illustratively travel in one direction (e.g., clockwise or counterclockwise) for a ring configuration. For example, a message at the terminating end of link portion 14 is sampled, or "read" or detected, by the internal circuitry of node 20 for possible transfer to its bus segment. Where appropriate, the message is retransmitted onto the originating end of link portion 16 to downstream node 22. In the case of a token message, the return of the token back to the node that created it (e.g., the primary node such as node 20) will be recognized by that node when it examines the message (and the primary node may or may not end up retransmitting the token message).

The number of segments on a system may vary from at least two up to six under the limits of present SCSI protocol, and possibly even more when using additional addressing options. A bus segment may have bus subsegments connected to it as long as the node is able to seize and release operating control of the subsegment with the segment.

The bus segment itself is a parallel conductor (e.g., usually formed of metal or any other conductive path media). All signals asserted on a segment are received by the node and all SCSI devices on its segment.

Proper operation of devices on the new system of the invention requires no special hardware or software modifications or additions to SCSI devices, and the system is transparent to the devices.

Each portal node serves as a doorway between the serial link 12 and the node's bus segment. The node itself is not per se a SCSI digital device of the conventional type, although it has the ability to imitate and perform various SCSI protocol operations.

Each node is assigned the highest priority identification or "address" for competing for control of its bus segment (i.e., higher than the highest priority SCSI device interfaced on the node's segment). Participation by the node in a competition for control of the segment converts that operation from a true arbitration among devices into an arbitration-like contention or pseudo-arbitration that the node dominates and is preordained to win by virtue of its assertion of a signal having higher priority than any device on the segment.

Each portal node contains circuitry for selectively transferring or not transferring digital information back and forth between the serial link and its segment. Signals originating and asserted by the node on its segment are recognized by SCSI devices on its segment as authentic SCSI signals even though they are spoofed or pseudo in that they do not come from a standard SCSI device.

3. The Portal Node Features of FIG. 2

Optical serialized messages arriving at a node (e.g., node 20) on link 14 are converted by its link signal receiver 52 to electrical signals. The serial electrical signals are converted by deserializer S/P 54 to parallel form and passed through a FIFO buffer 56 to the serial link signal selector 58, which selects (e.g., under microprocessor 70 participation) what is to be outputted by the node for transmission over the serial link. The parallel output from selector 58 is converted to serial form by serializer P/S 60 and transmitted out on link 16 to the downstream node by an optical link signal transmitter 62.

Incoming parallel signals are also sent to the microprocessor 70 (for examination) via the input port multiplexer 66. These incoming signals are also passed through receiving FIFO buffer 64 so that, at the microprocessor's direction, the signals may be sent to bus segment 26 without having to pass through microprocessor 70.

Microprocessor 70 (or simply processor 70) executes an operational program stored in memory 71 upon the supplying of power to the node. A suitable processor is the 80286 microprocessor of Intel Corporation. The processor 70 performs various SCSI protocol operations on or for the bus segment (described below) and controls the content of serial message transmissions originating from the node.

Any signals asserted on the node's segment 26 by one or more SCSI devices are detected by bus segment signal receiver 68, which transfers the individual parallel bit signals internally over a data bus 72 and a control bus 74. The data 72 and the control 74 signal buses in the preferred embodiment each have nine signal lines, corresponding to the SCSI signal bit protocol. The lines of signal bus 72 may be sampled by transmit FIFO buffer 76 at the direction of processor 70 to permit a streamlined transfer of data bit signals from the data bus 72 to link portion 16 (bypassing processor 70) and thus permit a higher data transfer rate between segment 26 and link 12 during operations such as information or data transfer. Comparator 78 samples certain signal bit lines of control bus 74 in a conventional manner to detect transitions in control signal levels on segment 26 so processor 70 may be notified of the changes. The Contention Logic Circuitry (CLC) 80 specifically samples the BSY and SEL bit signal lines from control signal bus 74.

Buffer transfer logic circuitry 82 samples the REQ and ACK bit signal lines from the SCSI control signal bus 74 and uses conventional known channel extension circuitry to optionally generate appropriate responses by the node such as P-REQ and P-ACK (e.g., pseudo-signals going back to a device of segment 26) to satisfy standard SCSI protocol during data transfer between a device on segment 26 and a device on a different segment.

Output port demultiplexer (DEMUX) 84 directs output from processor 70 to the proper internal circuitry (e.g., the INIT, PARB, and REL lines to CLC 80) or to serial link signal selector 58 or bus segment signal selector 86. Bus segment signal selector 86 also receives signals from CLC 80 (e.g., pseudo SCSI bit signals such as P-DB(7), P-BSY, and P-SEL and also node internal signal GMO). Selector 86 for the bus segment also receives signals from the receiving buffer 64 for placing on segment 26. Digital transmissions may be directed by processor 70 through receive buffer 64 to bus segment signal selector 86 (bypassing processor 70) when higher speed transmission rates are desired. Bus segment signal driver 88 asserts on segment 26 the true SCSI or pseudo SCSI bit signals received from bus segment signal selector 86.

Node 20 has a group of user-set dip switches called device switches 90, which serve to inform the node (e.g., its processor 70) of the specific address IDs of the devices interfaced on its segment. Each dip switch corresponds to a single SCSI ID available on the system (e.g., seven switches corresponding to IDs 0–6). The highest ID or 7 is reserved for the portal node itself. Each switch 90 corresponding to an ID used on the node's segment is set in the "on" position. Three dip switches called node switches 91 form an address group of switches to mark or identify a node. They are set to assign each node a unique three bit address code. The code is inserted into messages created by the node for transmission over the serial link.

4. The Contention Logic Circuitry of FIG. 3

Figure 2:
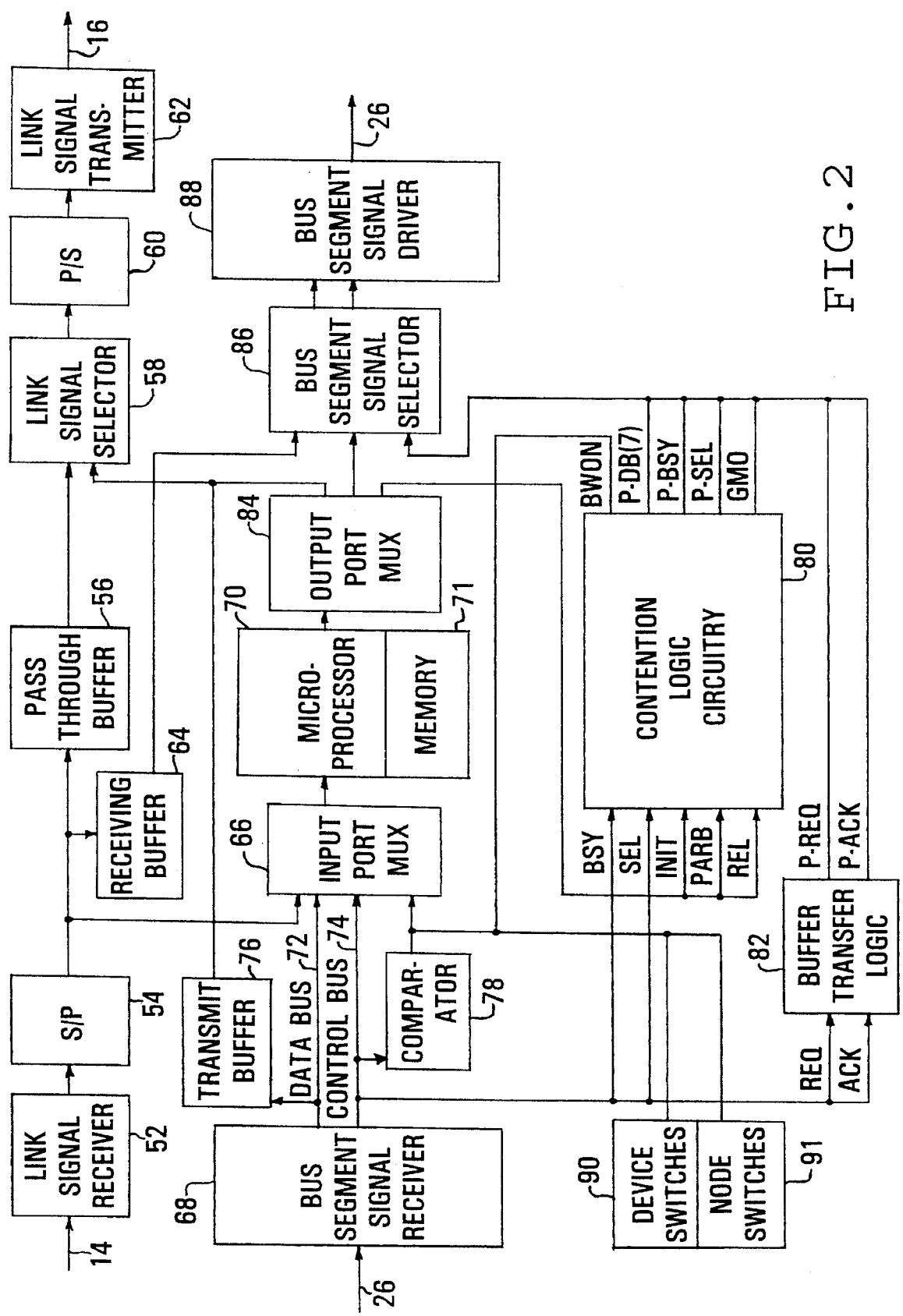
FIG. 2 is a schematic block diagram of elements and circuitry within a portal node of the invention.
Figure 3:
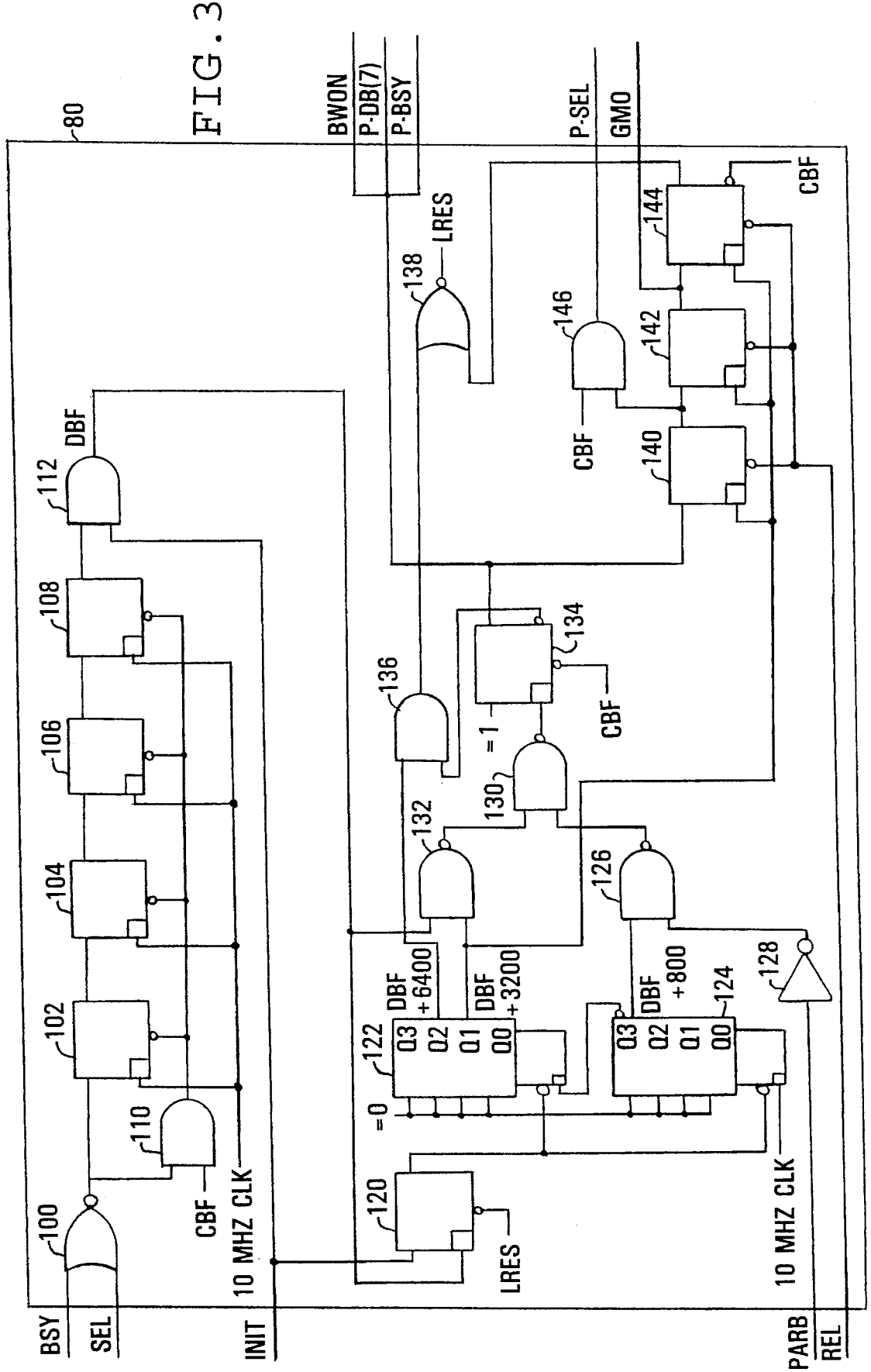
FIG. 3 is a schematic diagram of the logic elements of the contention logic circuitry in a portal node.

The internal details for the box labeled Contention Logic Circuitry (CLC) 80 in FIG. 2 are shown in FIG. 3. This circuit is employed to seize control of the node's bus segment. The CLC 80 can be conceptually divided into three sections, namely a detect BUS FREE section, a contention signaling section, and a bus segment seizure and control section. It will be apparent that one or more of these functions may be combined and that these functions may be performed by programmed microprocessor logic, or by hardwired logic, or various combinations. Also, other time periods than those described may be adopted, although it is preferable to adopt protocol not too strange to SCSI operation in order to avoid problems in system operation. The following description of hardwired logic circuitry and timing is but illustrative of one possible technique for implementing the present invention.

A. Detect BUS FREE (DBF) Section

To detect BUS FREE, the SCSI BSY and SEL signal levels on the node's segment are sampled from control bus 74 (FIG. 2) and are inputted into the CLC 80 at NOR gate 100 (FIG. 3). The output of NOR gate 100 is directed to a series of four flipflops 102, 104, 106, and 108. The flipflops are clocked at around 10 Megahertz so that the output signal of gate 100 will pass through each flipflop about 100 ns apart and propagate through the series of four flipflops in about 300 ns. (The BSY and SEL bit signal states arriving at NOR gate 100 are already about 100 ns "old" as a result of these signals having previously passed through a register (not shown) in receiver 68 (see FIG. 2), so that a true signal propagated through the end flipflop 108 is representative of the BSY and SEL bit signals 400 ns before.)

In addition to being directed to the four flipflops as aforenoted, the output of NOR gate 100 is also inputted into AND gate 110. The other signal line inputted into AND gate 110 is Clear Bus Free (CBF), which originates from the inverted output of flipflop 144 (at the seizure and control section of FIG. 3). The output of AND gate 110 is used to reset flipflops 102, 104, 106 and 108.

The AND gate 112 has inputs of the Initialize (INIT) signal line from processor 70 and the output of flipflop 108. The output of AND gate 112 is the Detect Bus Free (DBF) signal line.

For a BUS FREE state, the BSY and SEL signal lines on the segment must both remain false for at least 400 ns (according to the SCSI standard). When BSY and SEL are both false, the output of NOR gate 100 is true. This true signal is passed through flipflops 102, 104, 106 and 108. The INIT signal line applied to the input of AND gate 112 is made true by processor 70 during bus system initialization and remains true thereafter during all node operations. A true signal output from flipflop 108 applied to the input of AND gate 112 causes the DBF signal line to become true. The AND gate 110 does not reset the series of flipflops during the propagation of the true signal when the output of gate 100 remains true and CBF is true. (CBF is true wherever node 20 has not seized control of segment 26). A true signal on line DBF indicates that a BUS FREE state has been detected by the node on the bus segment 26.

If either (or both) the BSY or SEL bits are asserted (i.e., become true) on a bus segment at any time during a BUS FREE phase or within the period of about 400 ns after both BSY and SEL had initially become false, the DBF signal is made false by the detection circuitry. When BSY or SEL (or both) are true, the output of NOR gate 100 becomes false, causing the output of AND gate 110 to become false. A false signal sent from AND gate 110 to the reset terminals of flipflops 102, 104, 106 and 108 will reset the flipflops, thereby erasing any true signal on line DBF and any true signal which may have been propagating through the flipflops. This provision for resetting the flipflops permits the output of flipflop 108 to become true only if both BSY or SEL do not become true for the 300 ns required to propagate a true signal through the series of flipflops.

The AND gate 112 is inserted after flipflop 108 so as to provide a transition in the DBF signal in the event that the bus segment is already BUS FREE at the start of the initialization procedure for this new system. A transition in the DBF signal clocks flipflop 120 of the contention signaling section. Without AND gate 112, it is possible that no transition (e.g., a false to true signal transition) would be passed through the series of flipflops to line DBF until after a SCSI device on the node's segment had obtained (long after start-up initialization of the system) and then released control of the segment, whereupon the return to BUS FREE would finally provide a transition in the DBF signal so as to permit node seizure of the segment.

B. Bus Segment Contention Signaling Section

The contention signaling section is for generating pseudo-arbitration (or arbitration-like) signals for the node's contention for control of its bus segment. These signals are generated only after a BUS FREE phase for the segment has been detected.

In this section, the Initialize (INIT) signal line from processor 70 (FIG. 2) is inputted into flipflop 120, and a true signal on the DBF signal line from the "detect BUS FREE" section clocks flipflop 120. The output of flipflop 120 is able to initiate counting by counters 122 and 124. Counter 124 is clocked at about 10 Megahertz and produces a pulse on the DBF+800 line 800 ns after being started (i.e., about 800 ns after DBF becomes true, which is about 1200 ns after both BSY and SEL first became false). Counter 122 is clocked by counter 124 every 1600 ns and produces a pulse on lines DBF+3200 and DBF+6400 at 3200 ns and 6400 ns, respectively, after DBF becomes true.

The input signals for NAND gate 126 are line DBF+800 and the inversion by invertor 128 of the Permit Arbitration (PARB) signal line from processor 70. The output of NAND gate 126 is inputted into NAND gate 130. The NAND gate 132 receives input from the DBF+3200 line and the DBF signal line, and sends its output as an input to NAND gate 130.

The output of NAND gate 130 clocks flipflop 134, which has a constant true signal for its input. The output of flipflop 134 is directed (through signal selector 86 and bus signal driver 88 shown in FIG. 2) on the bus segment as P-BSY and P-DB(7). The output of flipflop 134 is also sent to processor 70 on the Bus Won (BWON) signal line.

The inverted output of flipflop 134 and the DBF+6400 line are inputted into AND gate 136. The output of flipflop 144 of the seizure and control section, described below, and the output of gate 136 are directed into NOR gate 138, whose output is the Logic Reset (LRES) line which is connected to the reset terminal of flipflop 120.

A false to true signal transition on line DBF will clock the true signal on the INIT line through flipflop 120, which in turn loads false (or zeros) signals into counters 122 and 124 to start a counting.

When the node is to seize control of its segment and prevent any device from successfully arbitrating for control of its segment, processor 70 makes the permit arbitration PARB signal false. The DBF+800 signal line from counter 124 will change from false to true at about 800 ns after BUS FREE detection (i.e., about 1200 ns from the time when both BSY and SEL first become false). When PARB is false, both inputs to gate 126 (PARB inverted and DBF+800) will be true 800 ns after BUS FREE is detected and thus the output of gate 126 will become false. The output of NAND gate 132 at this point in time is true because input DBF+3200 is false and input DBF is true. This causes the output of gate 130 to become true (about 800 ns after DBF becomes true) because the input from gate 126 is false and the input from gate 132 is true. Gate 130 output clocks flipflop 134, which sends a signal which causes the node circuitry (e.g., selector 86 and driver 88 of FIG. 2) to raise the P-DB(7) and P-BSY bits on bus segment 26. Also, the true signal output from flipflop 134 on the BWON line informs the processor 70 that seizure of control of the segment by the node has started. This is the beginning phase for the node to win the arbitration for control of its segment and thereby seize control of it.

When the node is to permit the devices on its segment an opportunity to successfully arbitrate for control of the segment without contention by the node (e.g., as when the node receives a token message to permit such arbitration), processor 70 makes the PARB signal true. When PARB is true, the inverted PARB input to NAND gate 126 will be false and the output of gate 126 will not become false at DBF+800 but will remain true (this prevents the node from asserting its P-BSY and P-DB(7) when DBF+800 is made true by counter 124). However, when no device on the segment is seeking to initiate an arbitration, the DBF signal into gate 132 is true. If DBF is true when counter 122 causes DBF+3200 to become true, NAND gate 132 has two true signals at its input and outputs a false signal to gate 130, which, along with the true signal input from gate 126, causes gate 130 to output a true signal. This true signal from gate 130 causes flipflop 134 to be clocked so that P-BSY and P-DB(7) are asserted by the node on its segment and a true BWON signal is sent to processor 70. This is the beginning stage for the node to reseize communication control of its segment because no device on the segment was interested in initiating any communication.

Raising P-BSY and P-DB(7) on the segment by the node signals that the node itself is contending for control of the segment. The node always wins this pseudo arbitration.

When node 20 has permitted devices to arbitrate for control without node contention and one or more devices do initiate an arbitration, the contention signaling section detects the arbitration and the CLC 80 of the node then refrains from asserting signals on its segment until the segment is detected to be BUS FREE again. The initiation of arbitration is detected when an arbitrating device asserts BSY on its segment. The assertion of BSY causes a resetting of flipflops 102, 104, 106 and 108 in the detect BUS FREE section of the CLC 80 and causes a false DBF output at gate 112. This false DBF is inputted to gate 132 and prevents the output of gate 132 from becoming false when input DBF+3200 becomes true (when the 3200 ns count is reached). With both inputs (from gate 126 and gate 132) to gate 130 thus being true, the output of gate 130 will not become true (i.e., will remain false) and flipflop 134 will not be clocked. The node will not assert P-BSY and P-DB(7) on its segment at this point and BWON does not become true. The node, however, may seize control of its segment when BUS FREE is detected again.

When a device has initiated an arbitration for control of the segment, the Logic Reset (LRES) line is used to reset the contention signaling section logic to prepare the circuitry for the next detection of BUS FREE. If the (inverted) output of flipflop 134 is true when DBF+6400 is made true by counter 122, this indicates that 6400 ns after DBF became true, the node has not initiated a contention on the segment and this causes the output of AND gate 136 to become true.

When the output of gate 136 is true and the output of flipflop 144 remains false (indicating that the node does not have control of its segment), the output of NOR gate 138 (the LRES signal line) is false and flipflop 120 is thereby reset. The logic is then ready for the next BUS FREE.

C. Bus Segment Seizure and Control Section

The bus segment seizure and control section of CLC 80 causes additional signals to be asserted on the node's segment in order to insure seizure and operating control of the segment. After initial control of the segment is established, the node may then impose a pseudo-busy condition on its segment or execute protocol communication operations on its segment based upon a message received over the serial link from some other node.

The output signal of flipflop 134 of the contention signaling section is fed into a series of three flipflops 140, 142 and 144. These flipflops are clocked by line DBF+3200 of counter 122 and may be reset by the RELEASE (REL) signal line originating from processor 70. The output of flipflop 140 and the Clear Bus Free (CBF) signal from flipflop 144 are inputted into AND gate 146. The output of AND gate 146 is directed (through bus signal selector 86 and driver 88 shown in FIG. 2) to the SEL signal line to produce a P-SEL signal on the node's SCSI segment. The output of flipflop 142 (FIG. 3) is the Gate Micro Output (GMO) signal which is also directed to signal selector 86 (FIG. 2) and allows processor 70 output signals to be put directly on the bus segment. The inverted output of flipflop 144, the CBF signal, is inputted to AND gate 110, and to AND gate 146 and to the reset terminal of flipflop 134.

A true signal output from flipflop 134 of the contention signaling section is passed through flipflops 140, 142, and 144 as line DBF+3200 clocks each flipflop.

In the case where the node has initiated contention (e.g., asserted P-BSY and P-DB(7)) for segment control at 800 ns after DBF becomes true, the true signal will be outputted by flipflop 140 3200 ns after DBF becomes true. This true output along with the true on line CBF into gate 146 causes the output of gate 146 to become true. The P-SEL signal is thus asserted on the segment, along with the P-BSY and P-DB(7) signals asserted at DBF+800, which under SCSI protocol causes all arbitrating devices on the segment to stop asserting signals on the segment. About 9600 ns after BUS FREE detection, flipflop 142 is clocked and the GMO signal becomes true, which causes bus segment signal selector 86 to pass various pseudo data bit (e.g., P-DB(7)) as well as pseudo control bus signals (described below) generated by processor 70 to the segment. At about 16000 ns after BUS FREE detection, the CBF line out of flipflop 144 becomes false.

In the case where the node has initiated contention for segment control at 3200 ns after DBF became true, the steps taken are the same but the timing of the steps are delayed. The SEL bit is asserted at 9600 ns (rather than at 3200 ns) and GMO becomes true at 16000 ns (rather than 9600 ns) after BUS FREE is detected. CBF becomes false at 22400 ns (rather than 16000 ns) after BUS FREE detection.

In either of the above cases, a false signal on line CBF causes the following "resetting" operations to be performed within the CLC 80: the output of AND gate 110 becomes false causing flipflops 102, 104, 106 and 108 of the BUS FREE detection section to be reset; flipflop 134 is reset so that the P-BSY and P-DB(7) signals are no longer asserted by flipflop 134 (although processor 70 may now be asserting those signals on the node's segment) and the output of AND gate 146 becomes false so that P-SEL is no longer asserted by CLC 80 (although processor 70 may also be asserting P-SEL). The actual signals asserted by the processor 70 may comprise signals for imposing a pseudo-busy condition on the segment or signals for transferring communications from another segment to the node's segment. These particular signals will be described below in the context of the procedure in which they occur.

5. The Initialization Procedure

Figure 4A:
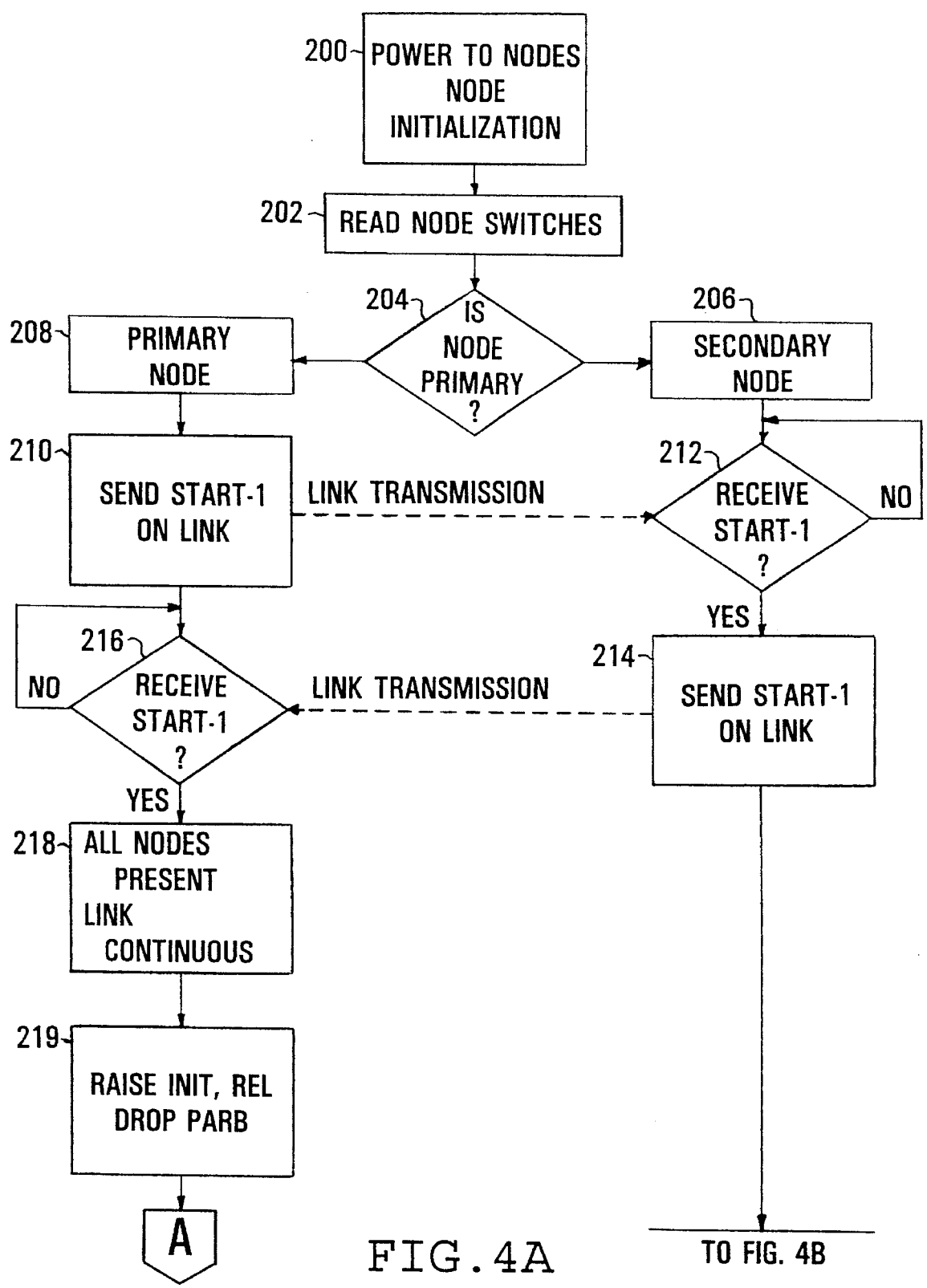
FIGS. 4A, 4B, and 4C are a schematic flow diagram of the initialization procedure of the new bus system.

In FIG. 4A, the initialization procedure commences upon the supplying of power to the nodes of the system (step 200). At this time, each node may perform various "node initialization" procedures by executing an operating instructions program stored in its memory 71 and other possible procedures performed within the node's circuits.

During the first stage of system initialization, the integrity of serial link 12 is verified. The processor 70 of each portal node reads the position of its node address dip switches 91 to determine its assigned node address on the serial link (at step 202). The processor 70 compares (at test 204) its assigned address to the primary node address (e.g., 001) designated in the operating program. If not assigned the primary address, the node is a secondary node (block 206) and the processor 70 waits for the node to receive a system initialization signal such as a "Start-1" signal over the serial link. The "Start-1" may be a bit combination recognized by the node as starting the first stage of initialization. If the node is assigned the primary address, the node assumes primary status (block 208) and the processor 70 creates the system initialization (Start-1) signal (step 210) which is transmitted over link 12 to the downstream node. Upon receiving the Start-1 signal (at test 212), the downstream secondary node retransmits (step 214) the Start-1 signal to the next downstream node and this is repeated until the Start-1 signal returns to the primary node. Once the Start-1 signal is received by the primary node (test 216), its processor 70 knows that all portal nodes are present and serial link 12 is physically complete or continuous (block 218) and system initialization can continue.

The second stage of initialization preferably comprises each portal node seizing control of the bus segment on which it is interfaced. For example, primary node 20 seizes control of its segment 26. The bus segment seizure operation begins with processor 70 in node 20 raising the logic signals INIT and REL and dropping the PARB signal that are sent to the hardware logic in the CLC 80 (step 219). Node 20 then executes the bus segment seizure and control routine of branch A (diagrammatically shown in FIG. 5 and described in greater detail below). At this point it should be noted that one or more of the bus segments on the system may already be operable and engaged with intra-segment communication prior to system initialization.

Figure 4B:
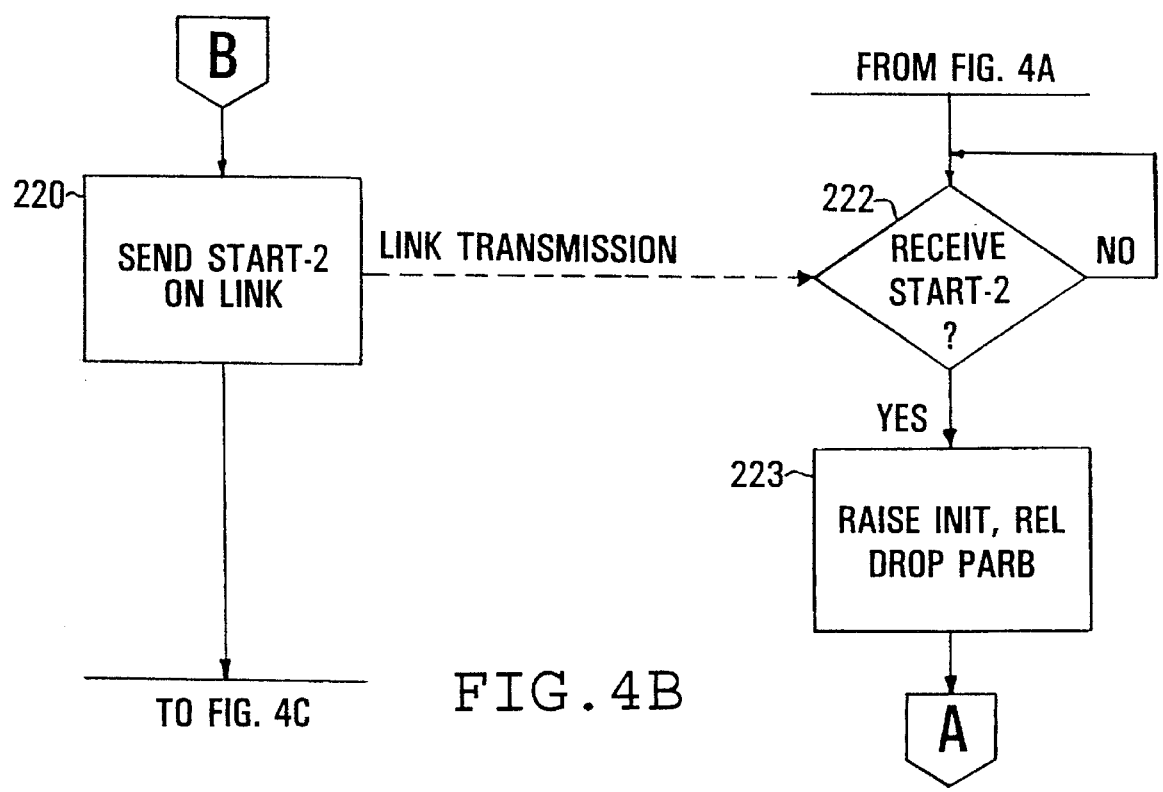

In the preferred procedure, once primary node 20 seizes control of its segment 26, its processor 70 (at step 220 of FIG. 4B) then generates for transmission a further initialization message (suitably identified as "Start-2") on link 12 to a downstream secondary node (e.g., node 22), thereby directing or authorizing node 22 to seize control of its bus segment 28.

Figure 4C:
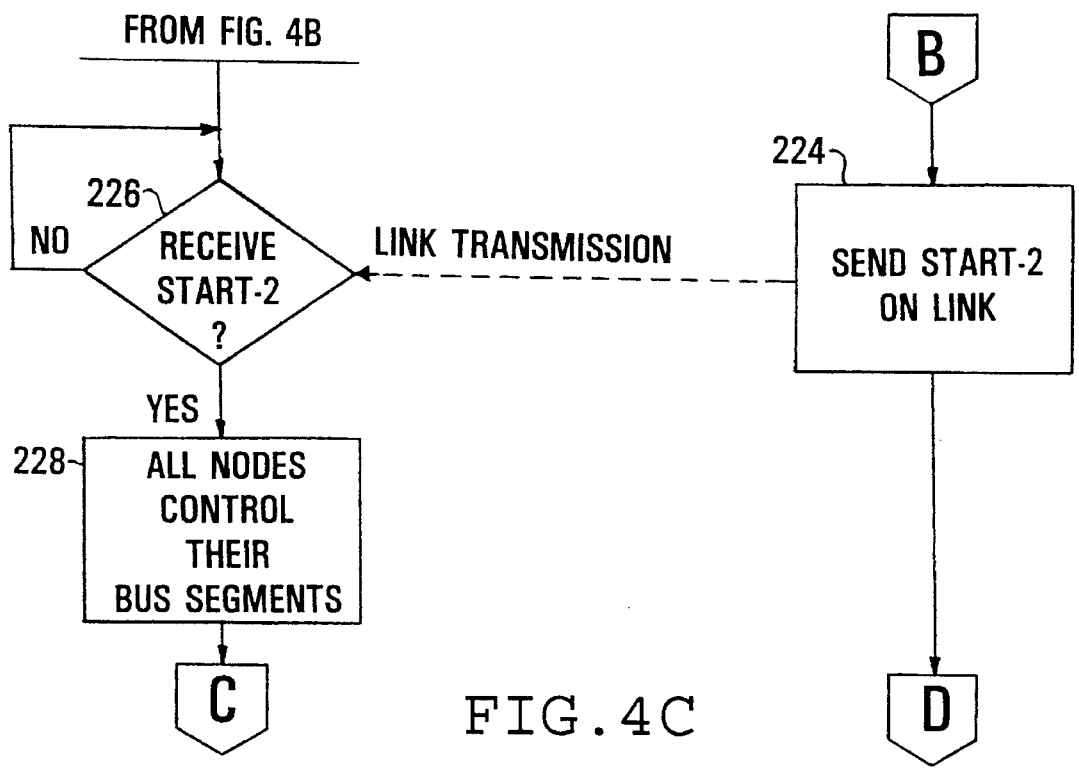

When a secondary node receives the Start-2 signal (test 222) on link 12, the block 223 actions by its processor (INIT and REL raised; PARB dropped) are inputted into its Contention Logic Circuitry and the node executes the seizure routine of branch A, thereafter returning to the initialization procedure in FIG. 4C. After seizure is accomplished, the secondary node enters the dormant (seized) mode procedure of branch D (shown in FIG. 7) after sending the Start-2 signal on to the next downstream node at step 224.

Seizure of the segments is preferably accomplished in a sequential manner around the ring of link 12, but a simultaneous or even random seizure by the nodes of their respective segments is permissible (preferably followed by verification that all nodes have seized operating control before any node releases its segment for arbitration).

Figure 6:
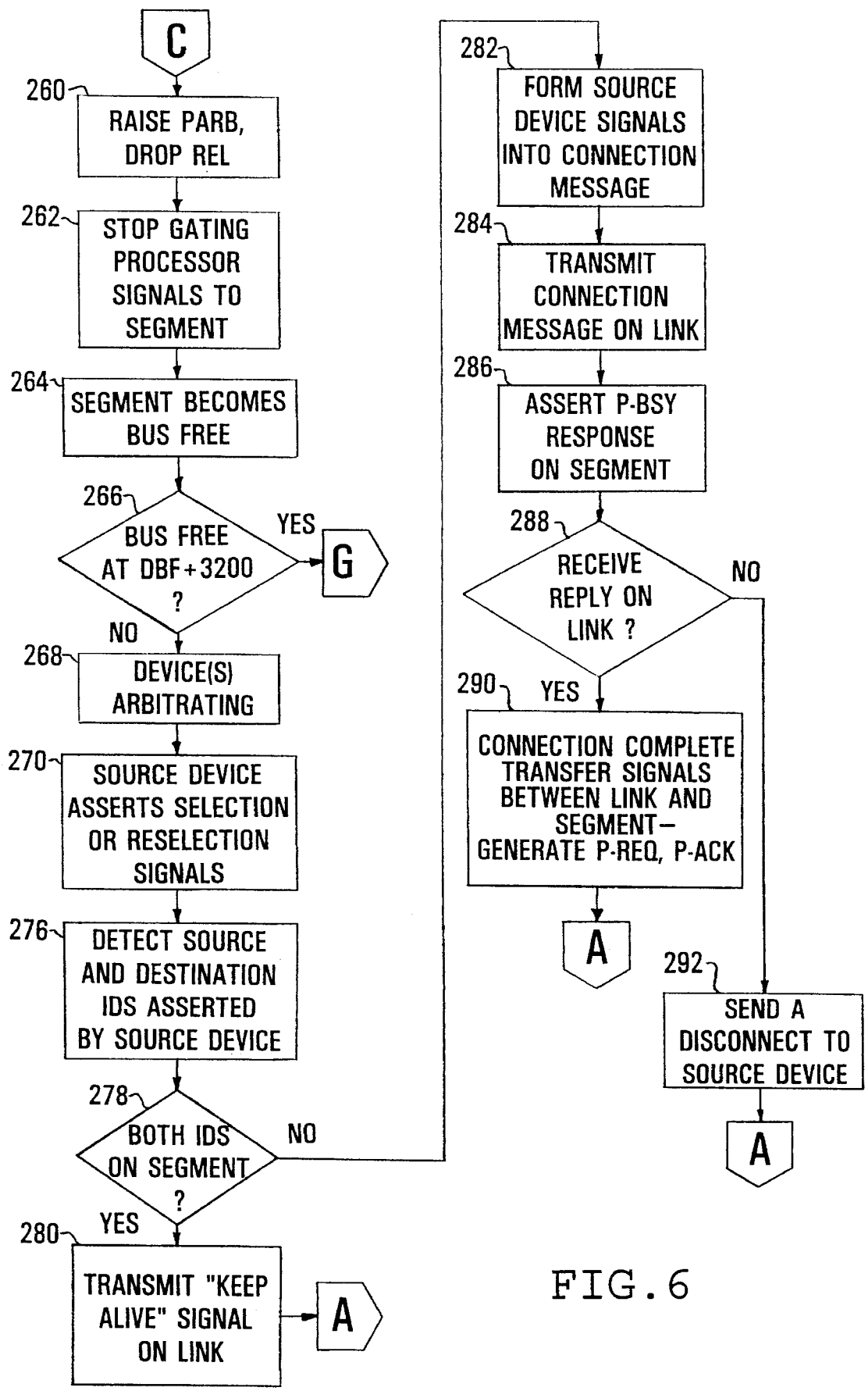
FIG. 6 is a schematic flow diagram of the active mode procedure of a portal node.

Once the Start-2 signal is returned to the primary node (at test 226), the processor 70 of the primary node knows that all nodes have seized control over their respective segments and the system initialization procedure is complete (block 228). The primary node then releases control of its segment by executing the active mode procedure of branch C (shown in FIG. 6 and described in greater detail below).

6. The Bus Segment Seizure and Control Routine of FIG. 5

Figure 5:
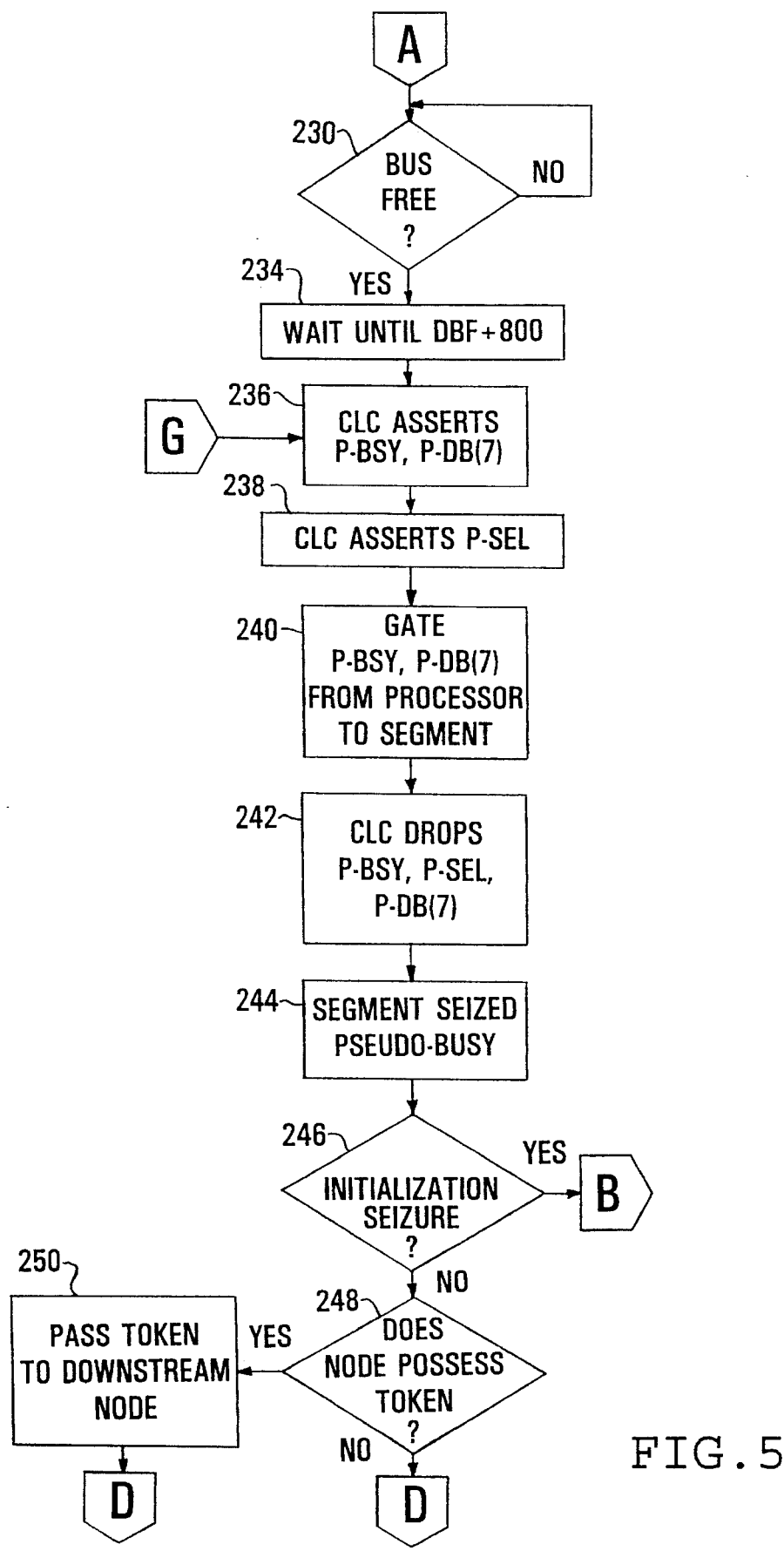
FIG. 5 is a schematic flow diagram of the bus seizure and control procedure executed by a portal node.

In FIG. 5 the seizure and control routine of branch A is shown.

Prior to attempting to seize operating control of a segment, the BUS FREE detection section in the CLC 80 of a node must detect that its segment is in the BUS FREE phase at test 230. Since the PARB internal signal from processor 70 is false when the node needs to seize its segment, the CLC 80 waits until 800 ns after BUS FREE is detected (block 234) before the contention signaling section of CLC 80 asserts the P-BSY and the highest priority (P-DB(7)) bits on its segment (step 236) which dominates the priority of any other devices seeking control in the pseudo-arbitration. The bus segment seizure section of CLC 80 asserts the P-SEL signal on the node's segment (step 238) which terminates the pseudo-arbitration by making all other competing devices relent and release their arbitration signals asserted on the segment. Signals generated by processor 70 (e.g., the P-BSY and P-DB(7) signals) are gated to the node's segment at step 240. The CLC 80 drops all signals (step 242) asserted by it on its segment (e.g., P-BSY, P-SEL and P-DB(7)), leaving P-BSY and P-DB(7) still asserted by processor 70. The processor 70 thus imposes the pseudo-busy condition (step 244) by maintaining the assertion of P-BSY (and preferably also P-DB(7)) and seizure of the bus segment is complete.

If the node is seizing its segment during the system initialization procedure, branch B is followed (to either FIG. 4B or 4C, as described above) at test 246. If the present bus segment seizure is not during initialization, processor 70 of its node at test 248 determines if its node "possesses" the token. If so (e.g., during the active mode procedure of the node), the token message is regenerated by the node and passed to the downstream node at step 250. If not (e.g., during a node's dormant mode procedure after a destination device on its segment has completed communication), there is no token to pass on. Whether or not the node has possession of the token, the node, maintaining the pseudo-busy condition on its segment, then follows branch D in FIG. 7, namely the dormant node procedure described below.

7. The Active Mode Procedure of FIG. 6

In the active mode or state, a node releases operating control of its seized segment to permit arbitration. The active mode procedure is executed by a node when that node detects that it has the power to do so, whether as a result of receiving the token message while in the dormant mode (e.g., from test 302 in FIG. 7) or by testing the serial link—or in the case of the primary node, when it seeks to permit arbitration on its segment just after system initialization has been completed (e.g., after step 228 in FIG. 4C).

In preparation for releasing control of the segment, processor 70 of the node raises the PARB signal (i.e., PARB becomes true) and drops the REL signal (i.e., REL becomes false) at step 260, and these changes are detected in the CLC 80. When REL becomes false, the GMO signal becomes false and processor 70 signals are no longer gated to the node's segment. The result is that the P-BSY and P-DB(7) bit signals maintaining the pseudo-busy condition are no longer asserted by the node and the pseudo-busy condition on its segment is terminated. The segment thus returns to the BUS FREE phase (block 264).

Devices on a released bus segment are free to initiate an arbitration on the segment by asserting BSY and their respective IDs within the protocol-defined time intervals. Since the PARB line is true, the CLC 80 will not initiate a contention for segment control at 800 ns after BUS FREE has been detected. If no device has initiated an arbitration and therefore the segment remains BUS FREE after a predetermined time period of about 3200 ns after BUS FREE has been detected (test 266), then branch G is followed to FIG. 5 where the segment is re-seized and the pseudo-busy condition is reimposed by the node. The token message is then passed on to the downstream node.

(At this point it should be noted that the predetermined time period allowed for device initiation of arbitration may vary from the specific period illustrated but should conform to the timing intervals of the communication protocol employed on the segments. The time period should not end before the timing of the devices allows them to initiate arbitration nor should it be so long that excessive time is spent waiting for communication to be initiated on one segment before moving to release another segment).

If a device or devices have initiated an arbitration for control (block 268) within the predetermined time period, the segment will no longer be BUS FREE at the end of the 3200 ns time period after BUS FREE was initially detected. The node will not reseize the segment at that point. The device "winning" (i.e., the source device) the arbitration will then assert the SEL control bit on the node's segment to end the arbitration. The source then initiates an address communication by asserting selection or reselection signals which include the source and destination device addresses, or IDs, at block 270.

The node's processor 70 detects the address communication signals (e.g., source and destination device IDs) asserted by the source device as part of a selection or reselection operation (step 276). Processor 70 (at test 278) compares the ID bits asserted by the source device to the IDs of the devices interfaced on its segment (indicated by the position of device switches 90) to determine if the source and destination devices are both interfaced on the same segment.

In the case where both IDs asserted by the source are on the same segment, the node does not transmit a connection message over the serial link. Instead, the node (at step 280) transmits a "keep alive" message over the link and ignores (e.g., doesn't transfer) the addressing communication signals and the subsequent information (data) transfer signals between the source and destination devices on the same segment. The destination device on the same segment detects the assertion of its ID by the source device and responds.

The comparison feature at test 278 avoids unnecessary transmission of communication messages over link 12 when the signals of the particular communication need only be transmitted over the active bus segment. The purpose of transmitting the keep alive message over the link is to prevent the other nodes from detecting an error because of an absence of messages on the link while the intra-segment communication is occurring. Once the active segment again becomes BUS FREE (indicating that the intra-segment communication has ended), its node executes the bus segment seizure and control routine (branch A, shown in FIG. 5).

In the case where one ID asserted by the source device does not match an ID indicated on the source node's device switches 90 (test 278), the processor 70 forms the address communication signals of the source device into a serial connection message (at step 282). (A preferred message format is described below). At step 284, this connection message is transmitted to the other nodes via link 12. When the message is received by a downstream node in the dormant mode, it executes the branch D procedure in FIG. 7.

8. Connection Facilitating Signals

Proximate to the time when the source node forms and transmits the connection message over the link during the active mode procedure, the processor of the source node will perform steps to facilitate the addressing operation of the source device.

Many source devices of SCSI protocol require a BSY signal response from the destination device within about 200 microseconds (selection abort time) after the source device has asserted address communication signals; otherwise the source device will terminate the attempt at communication. Satisfying this timing with the actual destination device BSY signal response (transferred over the serial link) is unrealistic for significantly extended buses (e.g., 10 and 20 kilometers).

Processor 70 of the source node satisfies the source device's timing need for a response by imitating a BSY signal response that the destination device would assert upon receiving the address communication (step 286). The source device is spoofed, or deceived, into believing that the response it needs has originated from the destination device. The source device believes that communication (a connection) between the source and destination devices has been established. This imitative BSY signal is a P-BSY signal like the pseudo-busy condition signal (P-BSY) asserted by a node during seizure of segment control.

If the destination device ID selected by the source device exists on the system, the destination node should take the connection message off the link and transfer it to the segment of the destination device having that ID. (How each node actually handles a connection message received on the serial link is described in greater detail below.) The "genuine" BSY signal response subsequently asserted by the destination device will be encoded into a message (along with any other destination device signals) and sent back to the source node, which has the effect of informing the source node (test 288) that its previously imitative (P-BSY) signal has become a genuine BSY response and communication has truly been established. The connection is now complete (step 290), and the node can transfer communications signals between the link and the segment and generate P-REQ and P-ACK responses to the device (described below). When the communication ends, reseizure of the segment is executed (branch A, FIG. 5).

If the connection message returns to the source node unused or no message containing a genuine BSY signal response is otherwise forthcoming from the destination node, the processor at the node of the source device (after a predetermined time) signals an error or a "disconnect" to the source device—and that ends the attempted communication by the source device (step 292).

The assertion by the source node of the imitative P-BSY response has different consequences depending on whether the operation attempted by the source device is a selection or a reselection operation. In the case of a selection operation, this P-BSY response satisfies the source (initiator) device's timing requirement and the source will generally wait for phase change signals from the destination (target) device before issuing further signals to the destination device.

9. The Link Message Format

An important link message is the connection message which establishes a communication path between the source and the destination devices during a selection or reselection operation occurring on the active bus segment. The connection message is formed by processor 70 of the active (or source) node from the address communication signals asserted by the source device. The message is then transmitted downstream to the one or more nodes in the dormant state or mode, one of which having the destination device interfaced thereon will pick up the signals for processing on its segment.

A preferred link message format comprises four ten-bit-long serial bytes, although other suitable formats may be used. The first byte of the message contains information pertaining to the bus system. Four bits of the first byte are a code identifying the type of message that follows (e.g., token message, connection message, keep alive message, etc.).

Thereafter, a three bit position is reserved for the address of a destination node (of a destination device), and this reserved position is especially significant for connection messages for reselection, Then a succeeding three bit group is reserved for the code representing the address of the source node which created this connection message (in both a selection or a reselection operation). Storage of addresses in memory 71 makes them available for reconnect as in reselection connection messages.

The second byte of the connection message contains the device address, or ID, of the intended destination device (e.g., the target in a selection operation or the initiator in a reselection operation) asserted by the source device on the active segment.

The third byte of the connection message contains a representation of the control signals from the control bit lines of the active bus segment.

The fourth byte of the connection message contains the device address, or ID, of the source device (e.g., the initiator in a selection operation or the target in a reselection operation).

10. The Dormant Node Procedure

Figure 7:
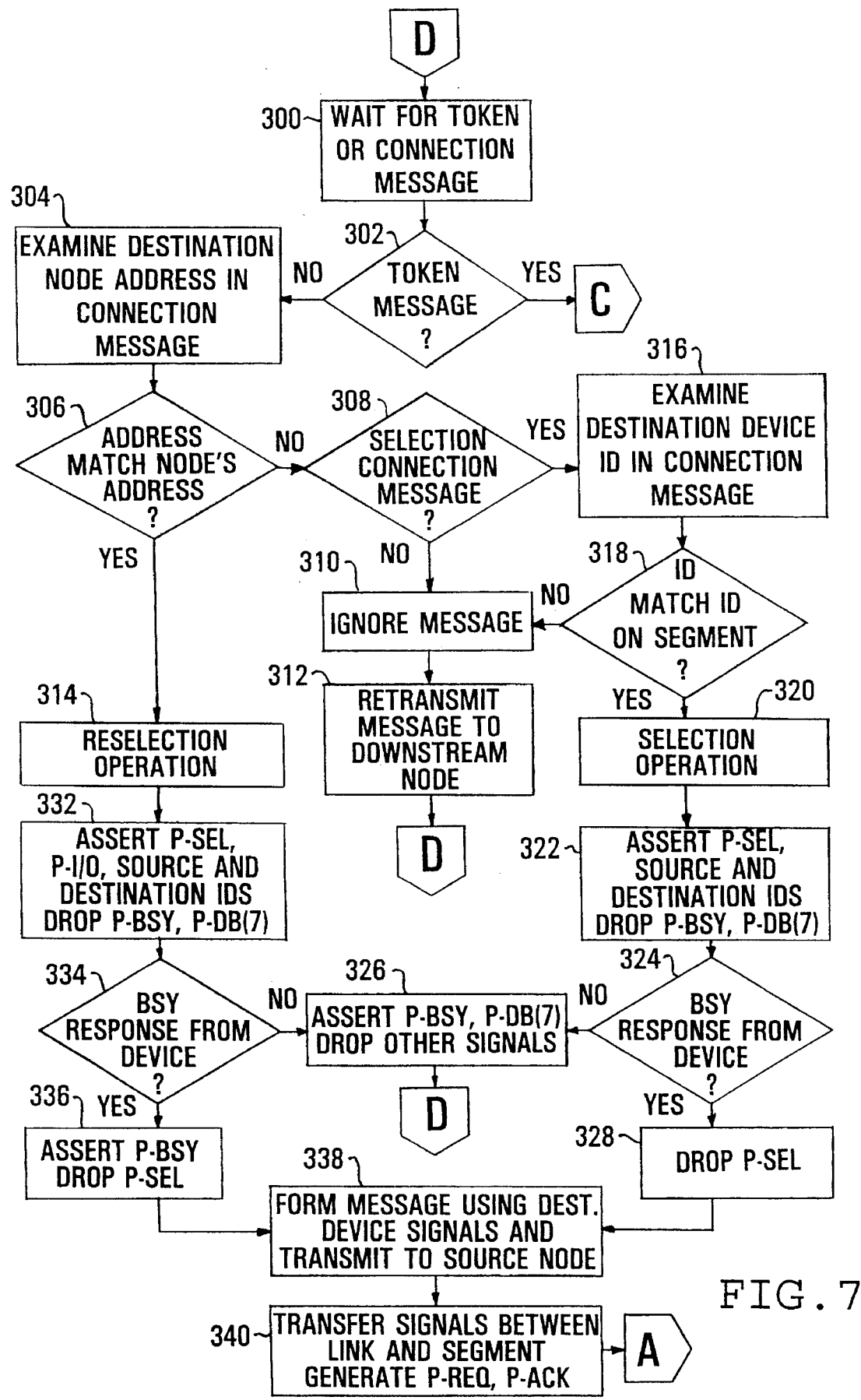
FIG. 7 is a schematic flow diagram of the dormant mode procedure of a portal node.

Illustrated in the flow diagram of FIG. 7 is the procedure executed by a node in the dormant, or inactive, mode. A dormant node waits for the receipt of serial transmission messages (e.g., token, connection, etc.) over link 12 (step 300). When a message is received, the node's processor examines the first two bits of the message to identify the message type (connection message, token message, etc.). If a token message is received, the node then executes the active mode procedure at test 302 (go to branch C in FIG. 6).

For each connection message received, the node's processor examines the three bit destination node address encoded in the message (step 304) and compares the encoded address to the address of the receiving node at test 306. If the encoded destination node address does not match the address of the receiving node (test 306) or the message type is not a selection operation connection message (test 308), the node ignores the connection message (step 310) and retransmits the message over the serial link to the next downstream node (step 312). If the encoded destination node address matches the address of the receiving node (at test 306), the address communication signals in the message are of a reselection operation and need to be passed by the node to its segment (the steps following block 314).

In the case where the message is detected to be a selection operation connection message (at test 308), the node then examines the destination device ID in the connection message (step 316) and compares the destination device ID to the IDs of the devices interfaced on segment 28 (as indicated by the positions of device switches 90) at test 318. If no match between device IDs is detected, the connection message is ignored (step 310) and retransmitted over the serial link to the next downstream node (step 312). If there is a match between device IDs, the signals in the message are of a selection operation and need to be passed by the node to its segment (the steps following block 320).

As shown after block 320, the recreation of selection operation signals by the node will first be described. At step 322, the processor reads the destination (target) and source (initiator) device IDs from the connection message and asserts those ID bits, along with the P-SEL bit, on the node's segment and then drops the P-BSY and P-DB(7) bits that maintained the pseudo-busy condition. The processor waits (at test 324) for the assertion of a BSY bit response from the destination (target) device (assigned the asserted ID) on the segment. If there is no BSY response from a device, the processor (step 326) raises P-BSY and P-DB(7) and drops all other bit signals previously asserted in order to reimpose the pseudo-busy condition on its segment. The node may then recreate and retransmit the connection message to downstream nodes or send a message to the source node indicating that no connection was established. The operation of the dormant node returns to step 300 to wait for further messages on the serial link.

If a BSY signal response is detected from the destination (target) device at test 324, the processor drops the P-SEL bit at step 328. The node then executes step 338 (described below).

Returning to block 314 (where the existence of a reselection operation on the active bus segment was determined), the processor reads the connection message source (target) and destination (initiator) IDs and asserts those ID bits and also P- SEL and P-I/O bit signals on segment 26 (step 332). The processor then drops the P-BSY and P-DB(7) bit signals. The processor then waits for a BSY bit signal response from the destination (initiator) device (test 334). If there is no BSY signal response from a device at test 334, step 326 is executed as described above. If a response is received, the processor raises the P-BSY signal and then drops the P-SEL signal at step 336.

When the destination device responds to the selection or reselection signals with the expected BSY bit signal response, the next step is to inform the source node that a connection has truly been established and that further communication between the source and destination device (e.g., information transfer operations) may proceed.

The destination node forms the BSY signal response and any other signals (such as the ATN bit) asserted by the destination device into a serial message and transmits the message to the source node (step 338). Information, or data, transfer operations are thereafter conducted over the bus system between the source and destination devices with the source and destination nodes and the serial link acting as transparent intermediaries (step 340). As a preferred feature, the nodes involved generate and transmit pseudointerlock, or "handshake," signals (in SCSI, REQ and ACK) to their respective devices to elicit signals transfer (rather than requiring that all interlock signals be transferred over the serial link). The generation of P-ACK and P-REQ is performed by the buffer transfer logic 82 (FIG. 2) in each portal node using known channel extension methods.

Upon termination of the connection by the devices, the (dormant) destination node detects its bus segment's return to the BUS FREE phase and control is reseized through the routine illustrated in FIG. 5 (branch A).

11. An Extended Addressing Feature

The extended addressing feature of the invention is an optional technique for increasing the total number of devices that can be interfaced on the bus system of the invention where the communication protocol, such as SCSI, of the system has only a limited number of device addresses, or IDs, available.

On a bus system of the invention without the extended addressing feature, each device is required have a SCSI ID that is unique throughout the entire bus system (similar to a conventional SCSI bus). This requirement limits the total number of devices on the bus system to seven, with each device permitted to function as a target or initiator. (The eighth device ID, ID=DB(7), is assigned to portal nodes on the system.)

On a bus system of the invention incorporating the extended addressing feature, each device functioning as a system target need be assigned an ID that is unique throughout the entire bus system. In contrast, each device that functions as an initiator (or as a target for devices on its bus segment) must only be assigned an ID that is unique to its particular bus segment (and, or course, the ID must not already be assigned to a device functioning as a system target on its segment). Therefore, the same device ID may be assigned to an initiating device (or non-system target device) on each and every segment of the system.

The extended addressing feature significantly increases the potential number of addressable devices that may coexist on a bus system. The relationship between the number of segments, target IDs and initiator IDs may be summarized as follows: one ID can belong to one system target device per system, but one ID can belong to one initiator or non-system target device per each segment. Therefore, adding more bus segments increases the potential number of devices that may be interfaced on the system. For each system target ID used on a system, the potential number of initiators or non-system targets on the system is decreased by the number of bus segments on the system.

The extended addressing feature is preferably implemented on the bus system by changing the operating program used by each node's processor 70 from normal SCSI addressing operation to extended addressing operation. The operational changes include having the processor 70 of the destination node substitute the node's ID (i.e., ID=7) in place of the source (initiator) device's ID during the transfer of the source device's selection signals by the destination device on its segment. The destination node stores (in its memory 71) the source device ID and source node address of the selection signals transferred for later use. The effect of this substitution is that if a reselection operation should be required later to complete this communication, the target (now acting as the source) device will assert the node's ID as the destination device (i.e., the "initiator" of the original selection operation), which prevents the target from inadvertently identifying an initiator-type device on that segment which is also assigned the same ID as the intended destination (initiator) device. When forming the connection message for the reselection operation signals, the source node recalls the node address and device ID previously stored in memory and includes this information in the connection message.

The identification of the destination node in the connection message is important on extended addressing systems which may have more than one initiator or non-system target device on the system using the same device ID. While two initiating or non-system target devices may share the same device ID, both will not have the same node address since an initiator's (or non-system target's) ID must be unique on its segment. Thus, a node receiving a connection message (carrying reselection addressing signals) will ignore the message if the destination node address does not match its address even if the destination device ID does match a device ID interfaced on its segment.

The extended addressing feature can also be used with interface protocols having a greater or lesser number of device identifications than in current detailed SCSI protocol.

12. Still Other Embodiments

Instead of token passing to authorize or instruct a node to release its segment for arbitration, the detection for arbitration at a node may depend on the node's communication access to the serial link. Arbitration at different nodes could vary according to different serial link node priorities. A carrier sense multiple access with collision detection (CSMA/CD) system might be used, as on Ethernet-based networks. On a system using CSMA/CD, all nodes could be programmed to seek control of the link whenever it is detected that no communication is occurring on the link. A node gaining knowledge or sensing that it has obtained control of the serial link would then release control of its segment in the manner described above to allow devices to arbitrate for control of its segment. A device winning control of the node's segment could then communicate over the link with another device on the system through the node's communication control of the serial link.

Prevention of arbitration on a segment (as in the seized state) may be accomplished in ways other than the method described above. For example, a node could prevent arbitration on a segment by simply asserting control (as by asserting the P-BSY or P-SEL bit) at some point in time after BUS FREE but prior to the expiration of the time that SCSI devices must wait before contending for control under normal SCSI protocol.

The serial link could be embellished with a central traffic detection device. Still other embellishments may be employed. The illustrated embodiment is therefore to be considered in all respects illustrative and not restrictive, the scope of the invention being indicated by the appended claims rather than the foregoing description; and all changes which come within the meaning and range of equivalency of the claims are intended to be embraced thereby.

That which is claimed is:

1. A method for enhancing extended distance communication on a Small Computer Systems Interface (SCSI) bus having an arbitration phase and at least two discrete bus segments with one or more SCSI digital devices interfaced on each segment and a serial link connecting the segments together, said bus additionally having a portal node interfaced on each segment through which serial link communications to and from the segment pass, said method comprising:

a) seizing operating control of each said bus segment from a BUS FREE state by the node interfaced thereon to prevent arbitration and transfer of data among devices interfaced on each said seized bus segment, and b) releasing operating control of a seized segment by the node interfaced thereon to permit arbitration only among devices interfaced on the released segment.

2. The method of claim 1 wherein each said node performs said step of seizing operating control of the bus segment on which it is interfaced before any SCSI device signals are transferred over said serial link.

3. The method of claim 1 wherein said step of releasing operating control of a seized segment is accomplished at no more than one said seized segment at a time.

4. The method of claim 1 wherein said step of seizing operating control of a bus segment comprises imposing and maintaining a false condition of communication activity on the segment.

5. The method of claim 1 wherein said step of seizing operating control of a bus segment by the node comprises a pseudo-arbitration on the node's segment with the node participating and preordained to win over all devices on the node's segment.

6. The method of claim 1 wherein said step of seizing operating control comprises node action involving:

i) detecting a BUS FREE phase on the node's segment, ii) asserting the highest priority bit signal on said segment to thereby dominate over any device that may contend for control of said segment, iii) asserting a pseudo-BSY bit signal on said segment, and iv) asserting a pseudo-SEL bit signal on said segment to terminate any contention by devices on said segment for control of said segment.

7. The method of claim 1 wherein said step of releasing operating control of a seized segment comprises node action terminating a false condition of communication activity on the segment.

8. The method of claim 1 wherein said step of releasing operating control of a seized segment follows a step whereby the node gains knowledge that it has access to the serial link for passing communication onto the serial link.

9. The method of claim 1 wherein said step of releasing operating control of a seized segment follows receipt by the node of a token authorizing the node to release operating control of its bus segment.

10. The method of claim 1 additionally comprising, after a predetermined time period has passed following said releasing of operating control of a seized segment, the step of either reseizing operating control of said released segment if no device on said released segment successfully gained communication control of said released segment through arbitration initiated during said time period, or initiating an address communication from a source device on said released segment to a destination device anywhere on said bus if the source device on said released segment successfully gained communication control of said released segment through arbitration initiated during said time period.

11. The method of claim 10 wherein said step of initiating an address communication comprises assertion by the source device of a signal or signals for the address of the destination device as well as the address of said source device, and said method additionally comprises detection by the node interfaced on the source device segment that the destination address indicates that the destination device is either on said source device segment or is on a different segment of the bus, and transmitting said address communication from said node onto said serial link to other nodes of the bus if the destination device is on a different segment of the bus.

12. The method of claim 11 wherein the destination device is on a different segment of said bus from said source device, and wherein said method additionally comprises the step of said node interfaced on said source device segment forming a connection message including said address communication with a code signal or signals identifying the node of said source device segment before performing said step of transmitting said address communication onto said serial link as a part of said connection message.

13. The method of claim 12 additionally comprising the step of one or more of said other nodes receiving said connection message and comparing the address of the destination device to the addresses of all devices interfaced on its segment, and further comprising the step of passing the connection message by a said other node onto its segment only if the destination device addressed is on its said segment.

14. The method of claim 11 wherein the destination device is on a different segment of said bus from said source device, and wherein said method additionally comprises the step of said node interfaced on said source device segment asserting a response signal imitating the signal that the destination device would assert if it had received said address communication, thereby spoofing the source device into believing that said source device has established communication with the destination device.

15. The method of claim 14 additionally comprising the step of transferring digital data between the destination device on one segment and the source device on another segment in a manner employing pseudo-signals of REQ and ACK generated by portal nodes on the respective segments.

16. The method of claim 1 wherein said SCSI bus comprises at least three said discrete bus segments, said method additionally comprising the step of passing a token message sequentially over said serial link between said nodes after all said segments have been seized, wherein the node possessing said token message is authorized to release operating control of its seized segment.

17. The method of claim 1 wherein after each bus segment has been seized, no more than one said bus segment is ever permitted to assume a BUS FREE state at one time so that arbitration cannot occur simultaneously on more than one segment.

18. The method of claim 1 wherein access by said portal nodes to said serial link is granted sequentially.

19. A system for enhancing extended distance communication on a Small Computer Systems Interface (SCSI) bus having an arbitration phase and at least two discrete bus segments with one or more SCSI digital devices interfaced on each segment and a serial link connecting the segments together, said bus additionally having a portal node interfaced on each segment through which serial link communications to and from the segment pass, said system being one wherein each said portal node comprises:

a) seizing means for seizing from a BUS FREE state operating control of the bus segment on which the node is interfaced to thereby prevent arbitration among devices interfaced on the seized segment, b) releasing means for releasing operating control of a seized segment to thereby permit arbitration among devices interfaced on the released segment independently of any other devices on said bus, and c) means for selecting when signals on the bus segment on which the node is interfaced shall not be passed over the serial link to any other bus segment, said selecting means being such that signals destined for a device on the bus segment on which said node is interfaced are included among those not passed over said serial link.

20. The system of claim 19 wherein each said portal node additionally comprises detection means for triggering operation of said releasing means only when no other node is operating its releasing means.

21. The system of claim 19 wherein said seizing means comprises means for imposing and maintaining a false condition of communication activity on the segment.

22. The system of claim 19 wherein said seizing means comprises means for conducting a pseudo-arbitration on the node's segment with the node participating and preordained to win over all devices on the node's segment.

23. The system of claim 19 wherein said node seizing means comprises:

i) means for detecting a BUS FREE phase on the node's segment, ii) means for asserting the highest priority bit signal on said segment to thereby dominate over any device that may contend for control of said segment, iii) means for asserting a pseudo-BSY bit signal on said segment, and iv) means for asserting a pseudo-SEL bit signal on said segment to terminate any contention by devices on said segment for control of said segment.

24. The system of claim 19 wherein said releasing means comprises means for terminating a false condition of communication activity on the segment.

25. The system of claim 19 wherein said releasing means includes means for detecting when said node has access to the serial link for passing communication onto the serial link.

26. The system of claim 19 wherein said releasing means includes means for detecting when the node receives a token from the serial link authorizing the node to release operating control of its bus segment.

27. The system of claim 19 additionally comprising means in each said node for detecting whether a device has initiated an arbitration for control of the node's bus segment during a predetermined time period following a release of operating control by said releasing means.

28. The system of claim 19 wherein said node includes means for reseizing operating control of a released segment if no device on said released segment successfully gained communication control of said released segment through arbitration initiated during a predetermined time period following the release of said segment.

29. The system of claim 19 wherein a source device and a destination device are interfaced on different bus segments, and the source device is one initiating a communication and the destination device is the intended recipient of said communication.

30. The system of claim 19 wherein each said node includes means for detecting the address of a destination device in an address communication initiated by a source device on said node segment, and means for including said address in a transmission from said node onto said serial link to other nodes of the bus when the destination device is not on the same segment as said source device.

31. The system of claim 19 wherein each node of said bus includes means for forming an address communication from a source device on its segment into a connection message including a code signal or signals identifying the node of said source device segment before sending said address communication as part of said connection message onto said serial link.

32. The system of claim 19 wherein one or more of said nodes includes means for asserting a response signal imitating the signal that the destination device on a different segment of said bus would assert if it had received the address communication intended for it from the source device on said node segment.

33. The system of claim 19 additionally comprising means for transferring digital data between a destination device on one segment and a source device on another segment in a manner wholly independent of SCSI bus timing constraints.

34. The system of claim 19 wherein said SCSI bus comprises at least three said discrete bus segments.

35. A system for extending a Small Computer Systems Interface (SCSI) bus, said system consisting of two or more nodes each interfaced on an attached segment of said SCSI bus and connected together by a serial link, each node controlling its attached SCSI bus segment by forcing the bus segment into a pseudo-busy condition upon detection of a BUS FREE state, the system being such that removal of said pseudo-busy condition from each said attached bus segment is limited to one said bus segment at a time, thereby allowing arbitration to occur on only one said bus segment at a time.

36. A system for enhancing extended distance communication on a Small Computer Systems Interface (SCSI) bus having an arbitration phase and at least two discrete bus segments with one or more SCSI digital devices interfaced on each segment and a link for digital communications connecting the segments together, said bus additionally having a portal node interfaced on each segment through which link communications to and from the segments pass, said system being one wherein each said portal node comprises:

a) means for preventing arbitration among devices interfaced on the node's bus segment, b) means for permitting arbitration among devices interfaced on the node's bus segment, and c) means for selecting when signals from a device on the node's bus segment shall not be passed over the link to any other bus segment, said selecting means being such that signals destined for a device on the bus segment on which said node is interfaced are among those not passed over said serial link to any other bus segment.

37. A method for enhancing extended distance communication on a Small Computer Systems Interface (SCSI) bus having an arbitration phase and at least two discrete bus segments with one or more SCSI digital devices interfaced on each segment and a serial link connecting the segments together, said bus additionally having a portal node interfaced on each segment through which serial link communications to and from the segment pass, said method comprising:

a) permitting arbitration to take place among devices interfaced on no more than one said bus segment at a time, b) detecting from an address signal of an arbitration winning device whether a destination device addressed by the arbitration winning device is on the bus segment of the arbitration winning device or on a different segment of said bus, and c) passing said address signal over said serial link to a different segment of said bus only if said destination device is on a said different segment of said bus.

* * * * *

UNITED STATES PATENT AND TRADEMARK OFFICE
CERTIFICATE OF CORRECTION

PATENT NO. : 5,528,765
DATED : June 18, 1996
INVENTOR(S) : James H. Milligan

It is certified that error appears in the above-indentified patent and that said Letters Patent is hereby corrected as shown below:

Title page, item [22], "Filed: Jun. 15, 1993" should read --Filed: Mar. 15, 1993--.

Signed and Sealed this

Twenty-fourth Day of September, 1996

Attest:

BRUCE LEHMAN

*Attesting Officer*   *Commissioner of Patents and Trademarks*